Nov. 17, 1964   E. F. LEDBETTER   3,157,217
AUTOMOBILE TIRE ACCESSORY
Filed Oct. 21, 1963
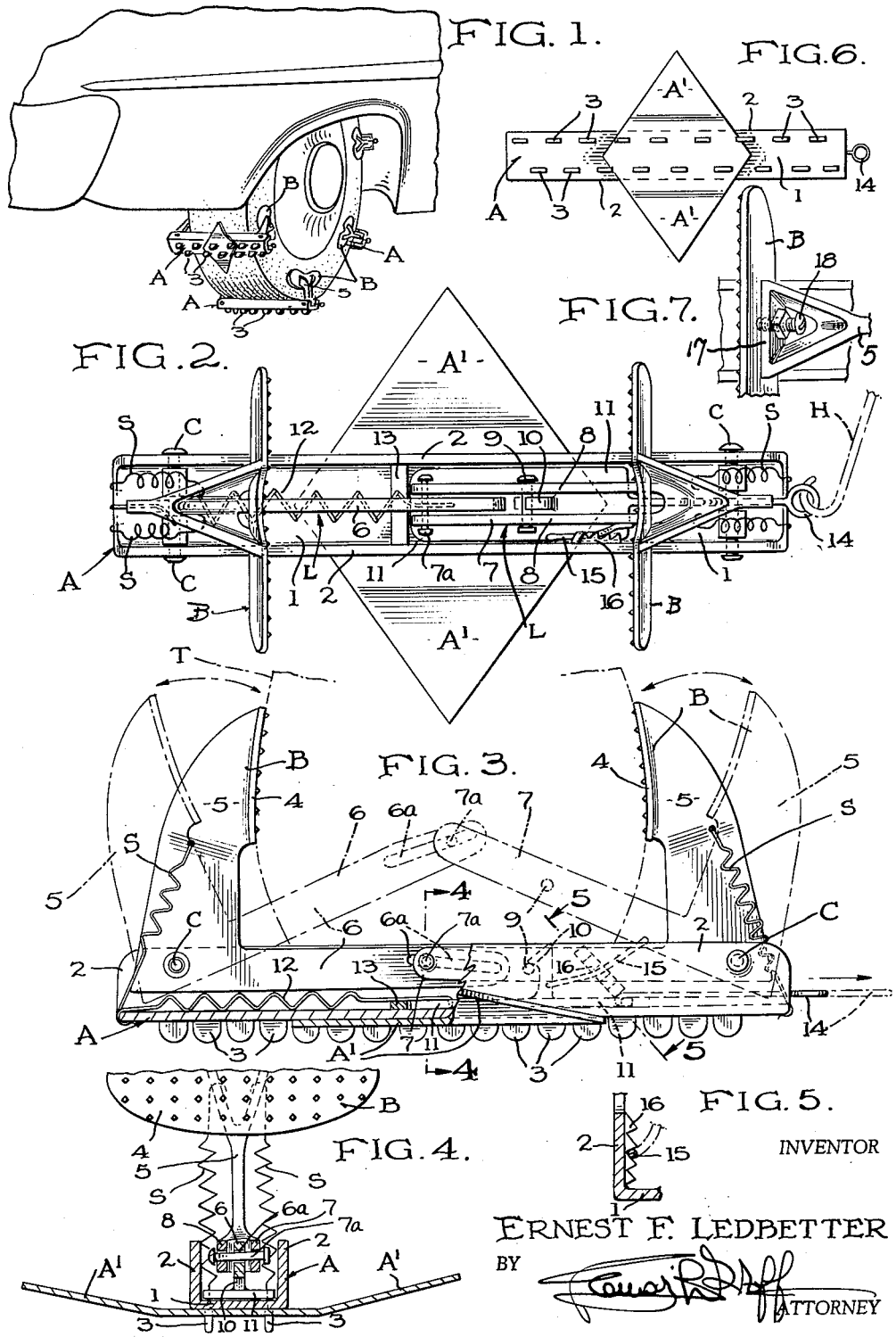
INVENTOR
ERNEST F. LEDBETTER
BY
ATTORNEY

United States Patent Office 3,157,217
Patented Nov. 17, 1964

3,157,217
AUTOMOBILE TIRE ACCESSSORY
Ernest Franklin Ledbetter, P.O. Box 8123,
Chicago 80, Ill.
Filed Oct. 21, 1963, Ser. No. 317,509
7 Claims. (Cl. 152—230)

This invention relates to an automotive accessory, and more particularly to a traction device adapted for use with the tires of power driven commercial and passenger vehicles.

One of the objects is to provide a simple and practical construction which, when not in use, occupies little storage space and, where it becomes necessary to apply it in operative position on a tire, this may be accomplished by a simple manual operation to first hold the unit in place, and secondly, whereby when the tire is rolled over the device, it becomes firmly locked in position against removal as the vehicle travels over a road surface.

Another object of the invention is to provide a construction which is easily and quickly applied in the manner above described and which on the other hand, can be readily removed manually when desired.

With the above and other objects in view which will more readily appear as the nature of the invention is better understood, the same consists in the novel construction, combination, and arrangement of parts as hereinafter more fully described, illustrated, and claimed.

A preferred and practical embodiment of the invention is shown in the accompanying drawings, in which:

FIG. 1 is a perspective view of several of the units constituting the present invention applied to a vehicle tire.

FIG. 2 is a top plan view of the device with the tire gripping members in the extended position in which they grip the sides of the tire.

FIG. 3 is a longitudinal sectional view, partly in elevation, illustrating the tire gripping members in the position where they are locked firmly to the sides of the tire, as illustrated by full lines, while the dotted line position indicates the relative position of parts before the device has been applied to the tire.

FIG. 4 is a detail cross sectional view taken on the line 4—4 of FIG. 3.

FIG. 5 is a fragmentary section taken on the line 5—5 of FIG. 3 to show the means for temporarily holding the tire gripping members in place by initial hand pressure so that the device will not fall off the tire while the latter is being moved to complete the final gripping phase of application.

FIG. 6 is a bottom plan view of the device shown in FIGS. 2 and 3.

FIG. 7 is a detail view illustrating how the tire gripping members may be adjusted relative to the ends of the levers to compensate for different width tires.

Similar reference characters designate corresponding parts throughout the several figures of the drawings.

In its general organization, the present device includes a body designated generally as A and the tire gripping members B hinged by bell crank type levers designated generally as L to the body A by the pivots C.

Referring first to the body A, it will be observed, particularly from FIGS. 2 and 4, that the same is of channel shape in cross section, thereby to include a bottom wall 1, spaced upstanding parallel side walls 2—2. The outer face of the bottom wall is provided with anti-skid gripping projections 3.

As will also be observed from the figures above referred to, the body A is provided with the centrally located ground engaging shoe A' whose medial portion is welded or otherwise secured to the outer face of the bottom wall 1 of the channel 2 for the purpose of increasing the area of traction with the ground. Preferably, the opposite side portions of the shoe A' are turned upwardly so as to provide increased bearing area between the device and the tire as it moves over the road.

The tire gripping members B include tire gripping plates 4 of substantial area carried by the upper arms 5 of said bell crank levers L mounted on the pivots C, which as shown in FIG. 2, span the distance between the wall 2—2 of the base.

The inner arm 6 of one of the bell crank levers is intended to move relative to the companion arm 7 in a manner now to be described.

For example, the arm 6 of single thickness is provided with a slot 6a intended to receive the cross pin 7a of the other arm 7. As will be clear from FIG. 2, this arm preferably consists of a pair of spaced parallel members 8 secured to the outer sides of the related tire gripping member 5 in order to receive the slotted end of the lever 6.

Also, the members 8 of the arm 7 are provided with a transverse keeper pin 9 intended to cooperate with the hook portion of a latch 10 mounted on a slide 11. This slide 11 is urged by spring 12, connected to its inner end toward and against an abutment 13 on the inner face of the bottom 1 of the channel base A. This spring 12 maintains the hook of the latch 10 in locking position when the device is secured to the tire and the arms 6 and 7 are in registry. As will be seen from FIG. 3, the upper end of the hook is inclined to guide the keeper 9 into locking position relative to the hook of latch 10 when the arm 7 moves from the upper dotted line position in FIGURE 3 to the lower position shown in both solid and dotted lines.

As will also be apparent from FIGS. 2, 3, and 6, one end, that is the exposed end, of the slide 11 is provided with a handle preferably in the form of an eye 14 which projects beyond the body A to receive, for example, a manipulating hook designated generally as $A^2$ when it is desired to move the device from the tire. That is to say, when the handle or eye pulls the slide 11 away from the abutment, the latch 10 will be disengaged from the keeper pin 9 to permit the arms 6 and 7 of the bell crank levers to move from the full line position to the dotted line position of FIG. 3 under tension of the springs S.

From the foregoing, it will be understood that the transverse keeper pin 9 and the hook of the latch 10 constitute the primary structure for holding the tire gripping members B in the position of use as shown in FIG. 3. In other words, when the tire T of FIG. 3 imposes its weight on the inner ends of the levers 6 and 7, the latter are moved from their broken line position into horizontal alignment and held locked by the latch means including keeper 9 and hook 10.

When it is desired to remove the device from the tire, it is only necessary to pull the slide 11 against the force of the spring 12 and away from abutment 13, by gripping or otherwise engaging the exposed eye or handle 14 to move it in the direction shown in FIG. 3.

Another important feature of the invention resides in means for temporarily securing the gripping members B in locked position.

That is to say, assuming that the device, before it is applied to the tire has the tire gripping members 5 disposed in their maximum spaced apart position as indicated by the dotted line position shown in FIG. 3, in which they are maintained by the springs S, which simultaneously maintain the arms 6 and 7 in the dotted line position of FIG. 3, the motorist takes the device in hand and moves the peaks of the angularly related arms toward the exposed portion of the tire tread. In so doing, the inner ends of the levers 6 and 7 first engage the tire and tend to move the members B inwardly against the force of the springs S.

Thus, it is desirable to have initial holding means for restraining the levers against the force of the springs S. Since the lever arms 6 and 7 are slidably interconnected, one of the arms, for example, the arm 7, is preferably provided with a temporary retaining bar 15 intended to engage with the toothed or serrated holding rack 16 preferably secured to the inner face of one of the side walls 2 of the base.

As will be observed from FIG. 3, when the lever arms 6 and 7 initially move from their inverted V-shaped position, the retaining member 15 and the rack 16 will hold the device against the tire while and until the latter has been moved sufficiently to flatten out the arms 6 and 7 to the full horizontal line position shown in FIG. 3.

As shown in FIG. 7, the tire gripping members B may be made separate from the inner ends of the bell crank lever arms 5 and connected thereto by a screw 18 threaded into a bridge piece 17 secured to the adjacent portions of the arms. By turning screw 18, the gripping members may be advanced or retracted independently of the arcuate path followed by the adjacent ends of the arms to suit tires of different width.

From the foregoing, it will now be seen that the present invention provides not only initial and subsequent means for operating the tire gripping members B in successive stages, but also makes it possible to readily effect the release of the members when the slide 11 is moved away from the abutment in the direction of the arrows, by applying appropriate force either by hand or with the aid of a tool in the direction of the arrow, FIG. 3.

I claim:

1. An automobile tire accessory adapted to be placed on an exposed portion of a vehicle tire initially by hand and automatically locked in operating position by moving the tire over it, including,
   a ground engaging base (A),
   an abutment (13) on the inner face of the base (A),
   a pair of bell crank type tire gripping levers (L) pivoted at their medial angular portions adjacent opposite ends of the base (A), said levers having their inner arm portions (6a+7a) slidably interlocked.
   tire gripping members (B) on the outer portions (4+5) of said levers (L),
   spring means (S) connected to the base (A) and to said outer portions (4+5) of said levers (L) normally maintaining the inner arm portions (6+7) in the form of an inverted V,
   cooperating latch means (9+10) on one of the arms and the base for locking the accessory on said tire under its weight,
   a slide (11) on said base (A) and carrying one part of said latch means,
   and spring means (12) for urging said slide (11) in position normally to engage said abutment (13) and maintain the latch means engaged and simultaneously depressing and locking the inner arms (6+7) in registering relation while maintaining the gripping members (B) in non-shifting relation with the tire.

2. An automobile tire accessory adapted to be placed on an exposed portion of a vehicle tire initially by hand and automatically locked in operating position by moving the tire over it, including,
   a ground engaging base (A),
   a pair of spring urged bell crank type tire gripping levers (L) pivoted at their medial angular portions adjacent opposite ends of the base (A), said levers having their inner arm portions (6a+7a) slidably interlocked,
   tire gripping members (B) on the outer portions (4+5) of said levers (L),
   cooperating latch means (9+10) on one of the arms and the base for locking the accessory on said tire under its weight,
   and manually operated means on the base for releasing said latch means.

3. An automobile tire accessory adapted to be placed on an exposed portion of a vehicle tire initially by hand and automatically locked in operating position by moving the tire over it, including,
   a ground engaging base (A),
   a pair of spring urged bell crank type tire gripping levers (L) pivoted at their medial angular portions adjacent opposite ends of the base (A), said levers having their inner arm portions (6a+7a) slidably interlocked,
   tire gripping members (B) on the outer portions (4+5) of said levers (L) initially spread apart to slip over a tire,
   cooperating means on one of the levers and the base to temporarily hold the tire accessory on said exposed portion of the tire,
   and cooperating latch means (9+10) on one of the arms and the base for locking the accessory on said tire under its weight to serve as a traction device.

4. An automobile tire accessory according to claim 3, wherein, the ground engaging base (A) has a slide carrying a part (10) of said latch means adapted to be manually moved to unlock said latch means (9+10) to release the levers (L) to the force of their springs and spread the tire gripping members apart.

5. An automobile tire accessory according to claim 3, wherein said cooperating means includes a spring bar on one of the levers and a toothed rack on the base.

6. An automobile tire accessory according to claim 3, wherein, the tire gripping members (B) are adjustable relative to the inner ends of the related arms to fit tires of different width.

7. An automobile tire accessory according to claim 6, wherein the arms (5) carry a threaded member (17) adapted to receive a screw (18) whose inner end bears against or is connected to the back of the tire gripping member, whereby, turning of the screw alters the said tire gripping member (B) relative to the inner end of the arm.

References Cited in the file of this patent
UNITED STATES PATENTS

| | | |
|---|---|---|
| 1,499,036 | Smith | June 24, 1924 |
| 2,445,947 | Hoppes | July 27, 1948 |
| 2,530,897 | Miller | Nov. 21, 1950 |